July 10, 1951 M. J. SNYDER 2,560,006
AUTOMATIC HUMIDITY REGULATING MEANS FOR ROOMS
Filed May 17, 1948
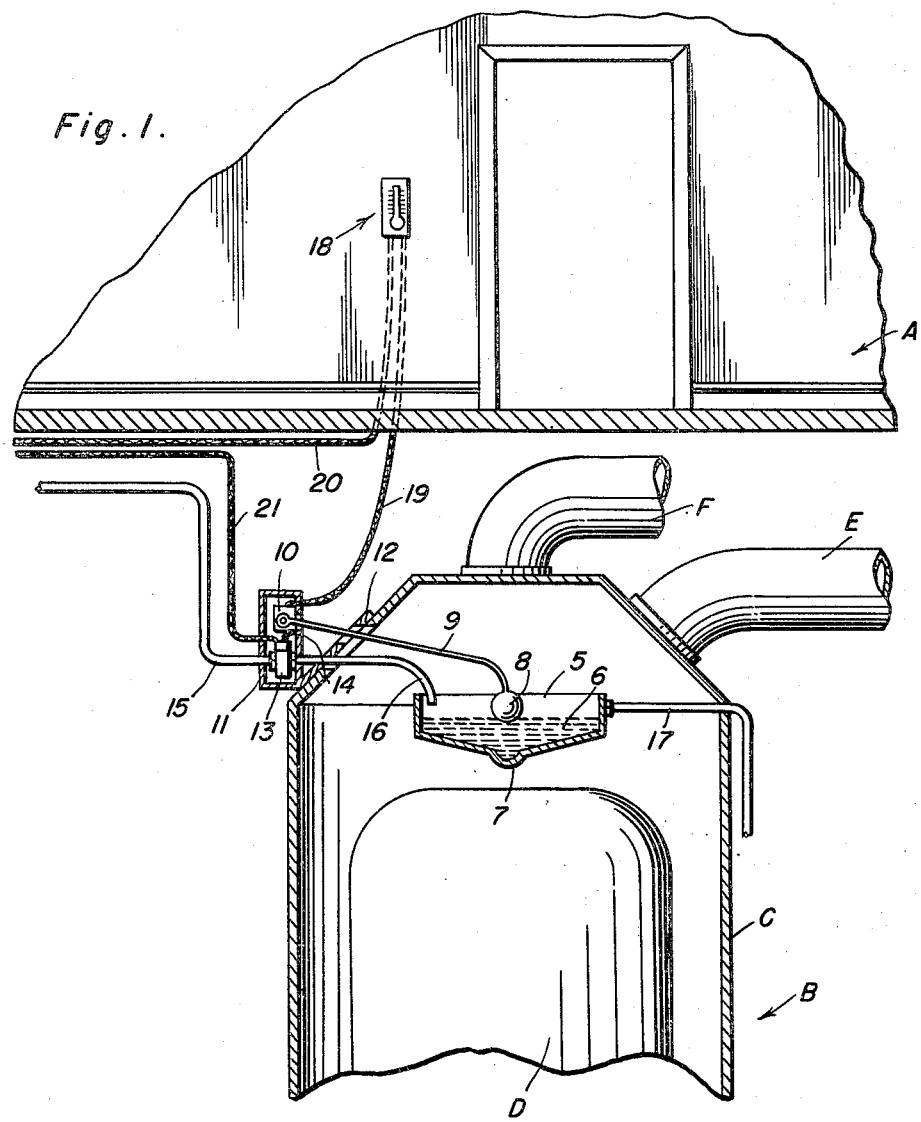
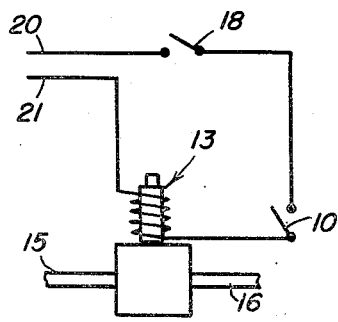
Myron J. Snyder
INVENTOR.
BY Clarence A. O'Brien
and Harvey B. Jacobson
Attorneys

UNITED STATES PATENT OFFICE

2,560,006

AUTOMATIC HUMIDITY REGULATING MEANS FOR ROOMS

Myron J. Snyder, Flint, Mich.

Application May 17, 1948, Serial No. 27,383

1 Claim. (Cl. 236—44)

The present invention relates to ways and means whereby humidity within the confines of a room or equivalent enclosed space may be automatically regulated and controlled, especially in relation to collateral sources of moisture already existing in said room.

It is a matter of common knowledge that air conditioning plants and systems involve the use, in many instances, of so-called humidifiers in an average or ordinary private home, especially where hot air (summer-winter) furnace is used since it is highly desirable to not only heat the air in the room but to also maintain same at the desired state of humidification so that the air will not be too moist or too dry for room occupants. A common arrangement for moistening and humidifying the air of a given enclosure or room has to do with the use of a small water containing pan which is located in the heated air or so-called plenum chamber of a hot air furnace. Usually, the pan is of small capacity, perhaps one quart measure more-or-less, and in many types of systems the water is delivered from the house supply by way of a visible drip valve located in the pipe line on the exterior of the casing of the furnace. The drops of water drop into a short copper tube or nozzle which then delivers the water, by gravity, into the pan, the pan having an overflow pipe to carry the water beyond the furnace should the pan begin to overflow.

A primary fault of these types of furnace and room humidifiers is that the hand-regulated drip valve is a constant source of trouble because the water supply, most of the time, is a mere trickle and causes waste stoppage ahead of the regulating needle valve and salt or residue stoppage after the water passes through the valve orifice, thus causing the stoppage of water supply unless it is forever checked by the man of the house and again and repeatedly adjusted for proper drip action.

One purpose of the present invention is to provide an automatically controlled solenoid valve which is switch operated through the medium of a float and float carrying arm, the float being arranged to follow the water level in the pan so that when the pan needs replenishing, the float goes down, opens the valve and permits the pan to be filled to a predetermined level whereupon the valve is again and automatically closed.

Stated somewhat more specifically, I contemplate the adoption and use of an electromagnetic or so-called solenoid valve which is also located exteriorly of the furnace casing and which turns the water on or cuts the water off according to prescribed conditions and which is such that the line on diametrically opposite sides of the valve is forcibly flushed, thus minimizing the aforementioned stoppages and keeping the valve and water line substantially clean and unclogged.

A further objective is to provide a novel water controller unit for a humidifier pan which embodies a casing to be attached to the furnace on the exterior, said casing embodying the solenoid cut-off valve and a suitable electric switch, said switch being electrically connected to energize and deenergize the valve and the said switch being constructed to accommodate the float carrying arm, whereby the switch is mechanically snapped "on" and "off" by the arm, whereby the switch, in turn, serves to automatically open and close the stated valve.

In addition to the above it is an object of the invention to provide an assemblage characterized by the pan, the automatic valve, the switch and float means associable with the pan in controlling the valve, there being, in addition, a humidostat embodying the primary switch which is connected with the first named or secondary switch to permit the humidifying pan to be brought into use or thrown out of use depending on the call for humidity in the room or rooms to be humidified.

Experience has shown that there are times when the furnace is running and the humidifier is operating simultaneously therewith, because of other conditions in the home, humidification from the furnace ducts is not, at the time, required; for example, when the housewife is washing clothes indoors, or the clothes are hung in the kitchen or elsewhere, when extensive cooking and canning is being carried on, there is already sufficient moisture and condensation in the surrounding air to negative the need, at the same time, of the stated humidifier. Therefore, there are times when it is desired, and even though the furnace is operating, to temporarily throw the humidifier out of use. It is, therefore, another object of my invention to provide a humidostat including a suitable switch which is connected with the stated valve controlling switch, whereby the humidostat determines when the moisture condition of the room is such that the humidifier in the furnace is not, at the time needed but automatically brings the latter into play again when the dryness of the air is such that humidification is wanted.

Other objects and advantages of the invention will become more readily apparent from the following description and the accompanying illustrative drawings.

In the drawings:

Figure 1 is a view of a fragmentary type, partly in elevation and partly in section, which shows a portion of a room, a portion of a furnace in the cellar or elsewhere, and humidification means and controls constructed in accordance with the principles of the present invention;

Figure 2 is a diagrammatic view including the wiring, primary and secondary switches and solenoid valve.

Referring now to the drawings by distinguishing reference numerals the reference character A designates a room or other equivalent enclosure which is to be air conditioned from the furnace or air conditioning plant B in the cellar or similar quarters. The furnace comprises a suitable casing or jacket C and air heating drum or equivalent part D to house the burner (not shown). It is understood, of course, that the burner may be operated from gas, oil or equivalent fuel, from coal or the like. The air conditioning plant or furnace shown is for summer and winter use. In addition the cold air return duct is denoted by the reference character E and the hot air supply or delivery duct by the reference character F. All of these are old parts.

The invention has to do with a simple well-type water containing humidifier pan 5 which is shallow and which is adapted to contain a quart, more or less, of water 6. There is a drop well or indentation 7 in the bottom which serves to accommodate the raisable and lowerable float or ball 8. This is carried on the downturned end of a lever or arm 9. The arm is connected with a suitable current controlling and delivering switch 10 this being located in a box or the like 11 attached by a bracket or the like 12 to the furnace jacket. Mounted in the same box is an electro-magnetic or solenoid cut-off valve 13 which is wired, as at 14, to the secondary switch 10. Thus the switch, which may be called the valve control switch, serves to turn the valve on and off and to in this manner regulate the flow of water into the pan. The water is fed from a delivery or supply pipe 15, from the customary source into a nozzle-like extension 16 which overhangs the wall of the pan and feeds water to the pan. By having the nozzle separate from the pan, the pan may be put in position in the furnace without difficulty from the nozzle end 16. Incidentally, the numeral 17 designates an overflow pipe which leads to the exterior of the furnace jacket. This is a customary feature in humidifying pans.

The numeral 18 designates a suitable switch equipped humidostat (not detailed) which may be mounted in the ducts but is preferably fixedly mounted on a wall in the room, similar to a thermostat. There is a wire 19 leading from the primary switch in the humidostat to the secondary switch 10. The current conducting wire is also connected with the switch 10 and is denoted by the numeral 20. The current supply wire 21 is connected with the solenoid valve 13 as shown diagrammatically in Figure 2.

When there is a normal call for humidification by the humidostat switch 18 the latter is closed which, obviously, completes the electric circuit to the valve controlling switch 10 which latter is controlled by the lever or arm 9 from the pan 5. If the water in the pan is low said lever 9 causes switch 10 to close thus opening the valve 13 and allowing water to flow through pipe line into the pan 5. As the water 6 in pan 5 rises this also causes float 8 to rise and causes switch 10 to open, thus closing valve 13 and cutting off the water supply. The water in the pan is used in humidifying the air in the room, as usual. This sequence follows through until humidostat 18 is satisfied and when the switch in latter opens on the rise of relative humidity in the air, it opens circuit to the valve switch 10 and then, if float in pan does go down and closes the latter switch 10, no water will be allowed to flow into pan until the relative humidity in the air surrounding the humidostat switch 18 goes down to a degree allowing latter switch 18 to close, thus completing the circuit again through to switch 10 to allow resumption of humidification cycle. At this time said valve 13 will open again and allow water to flow into pan 5 and the first order of sequence begins again, thus allowing humidification of the air passing through the heated air chamber of the furnace.

The reason for shutting off the humidifier is that, in homes especially, there may be other and collateral humidification to contend with; such as that brought into being by the washing and drying of clothes indoors during the winter time. Also cooking and canning of things in the kitchen, supplies a certain amount of moisture. Thus, by being able to periodically and temporarily throw out all humidification from the furnace, the already existing humidity may be distributed and absorbed throughout the rest of the home without causing "sweating" on walls, and the like.

By using the humidostat switch 18, which is actually a measuring device, to determine the relative humidity in the air, I bring into being a novel system of measured air-moisture control.

The humidifying section, consisting of the pan 5, and float 8 assembly, plus the switch 10, plus the solenoid control valve 13 may be used, when properly wired, without the humidostat, whereby to provide for novel water and pan control.

By using a relatively small pan of the type shown and described the capacity is limited to approximately a quart or less of water. In the circumstances humidification in the home will never reach a saturation point.

As previously stated the nozzle portion 8 of the water supply line or pipe should be free of direct mechanical connection with the rim or wall of the pan whereby to permit the pan to be suitably mounted at the time of installation of the furnace, or replaced but in proper relationship also.

It is also to be mentioned that the humidostat does not necessarily have to be fixedly mounted on a room wall. It could be mounted for satisfactory control purposes, for example in the ducts E and F.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

In a structural assemblage of the class shown and described, in combination, a furnace, a room, ducts connected with the furnace and in communicative relation with said room, a water containing and humidifier pan mounted in the usual plenum chamber of said furnace, said pan being completely open at its top, a water supply pipe leading from a source of supply and having a nozzle portion extending from the exterior of the furnace into said plenum chamber and depending and discharging into said pan, said nozzle portion being free of mechanical connection with said pan, a solenoid valve mounted in said supply line, a secondary switch electrically connected with said valve for energizing and deenergizing the valve and consequently opening and closing said valve, an enclosing box mounted on the exterior of said furnace and enclosing said solenoid valve and said secondary switch, a float arm separate from but in close proximity to said nozzle portion, said arm being mechanically connected at one end with said secondary switch for snapping the latter "on" and "off," the remaining end of said arm overlying the open top of said pan, a float secured on the last-named end of said arm and adapted for cooperation with water in the pan, and a humidostat in said room, said humidostat having the usual circuit make and break switch, the latter being the primary switch and being electrically connected with said secondary switch, whereby the source of humidity supply in said furnace is temporarily and automatically thrown out of use and said pan is emptied and permitted to remain empty until said humidostat, under room conditions, calls for humidification from the furnace.

MYRON J. SNYDER.

REFERENCES CITED

The following references are of record in the file of this patent:

UNITED STATES PATENTS

| Number | Name | Date |
|---|---|---|
| 1,294,073 | Faber | Feb. 11, 1919 |
| 1,918,128 | Pfening et al. | July 11, 1933 |